(12) United States Patent
Hashiguchi

(10) Patent No.: US 9,221,325 B2
(45) Date of Patent: Dec. 29, 2015

(54) SIDE DOOR STRUCTURE FOR VEHICLE

(71) Applicant: HONDA MOTOR CO., LTD., Tokyo (JP)

(72) Inventor: Sotaro Hashiguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1 day.

(21) Appl. No.: 14/256,236

(22) Filed: Apr. 18, 2014

(65) Prior Publication Data

US 2014/0312649 A1  Oct. 23, 2014

(30) Foreign Application Priority Data

Apr. 19, 2013  (JP) ................. 2013-088214

(51) Int. Cl.
*B60J 10/00* (2006.01)
*B60J 10/08* (2006.01)
*B60J 5/04* (2006.01)

(52) U.S. Cl.
CPC .............. *B60J 10/085* (2013.01); *B60J 5/0413* (2013.01); *B60J 5/0418* (2013.01)

(58) Field of Classification Search
CPC .... B60J 10/0045; B60J 10/085; B60J 5/0413; B60J 5/0418
USPC ............................ 296/146.11, 146.5, 146.9
See application file for complete search history.

(56) References Cited

U.S. PATENT DOCUMENTS 8,876,188 B1 * 11/2014 She et al. .................. 296/146.7

FOREIGN PATENT DOCUMENTS

| JP | 07-228147 A | 8/1995 |
| JP | 2007-039981 A | 2/2007 |
| JP | 2009-107365 A | 5/2009 |

OTHER PUBLICATIONS

Japanese Office Action dated Dec. 18, 2014, issued in corresponding JP Patent Application No. 2013-088214 (6 pages).

* cited by examiner

*Primary Examiner* — Glenn Dayoan
*Assistant Examiner* — Melissa A Black
(74) *Attorney, Agent, or Firm* — Westerman, Hattori, Daniels & Adrian, LLP

(57) ABSTRACT

A side door structure for a vehicle, the side door structure includes a door sash; a door panel; and a door checker which is spaced just below the door sash. A door checker is mounted on a door inner panel having a recess which is depressed inward the side door. The bottom surface of the recess has a central portion formed at the deepest position in a central height area, and an upper inclined portion inclined upward from the central portion to an upper end edge of the recess. The upper end edge of the upper inclined portion is formed such that the outer end thereof in a vehicle width direction is a top portion. The top portion is located inwardly of an extension line of the laterally inward end of the door sash, and is located inwardly of a lower end of the door sash.

10 Claims, 9 Drawing Sheets

SIDE DOOR STRUCTURE FOR VEHICLE

CROSS REFERENCES TO RELATED APPLICATIONS

The present application claims priority under 35 U.S.C. §119 to Japanese Patent Application No. 2013-088214, filed Apr. 19, 2013, entitled "Side Door Structure for Vehicle." The contents of this application are incorporated herein by reference in their entirety.

TECHNICAL FIELD

The present disclosure relates to a side door structure for a vehicle having a side door provided with a door checker which is spaced just below a door sash.

BACKGROUND

A common vehicle has a door checker for stopping an opening operation of a side door when the side door is half opened or fully opened. The door checker is provided in the door panel of the side door, and one end of the door checker is connected to the body of the vehicle. The side door is provided with a door sash. In the inside of the side door, the lower end of the door sash is connected to the door panel. In the case where rainwater flows over the door sash and enters the inside of the side door, the rainwater comes into contact with the door checker through the door panel, which is not preferable. A known technology for diverting the water through the door panel is disclosed, for example, in Japanese Unexamined Patent Application Publication (JP-A) No. 7-228147. Furthermore, a technology for diverting the water from the door sash is disclosed in, for example, Japanese Unexamined Patent Application Publication No. (JP-A) 2009-107365.

In the technology known from JP-A No. 7-228147, a bead-shaped guide is inclinedly formed in the door panel below the door sash, and the flowing direction of water, which falls over the door panel, is changed by the guide.

In the technology known from JP-A No. 2009-107365, a space for mounting a door checker is provided, and an extending portion, which laterally extends inclinedly from the lower end of the door sash, is provided above the door checker mounted on the space. In this manner, running water from the door sash laterally flows aside from the door checker.

However, providing the door panel with a bead-shaped guide as described in JP-A No. 7-228147 causes a complicated structure. On the other hand, providing the lower end of the door sash with the extending portion as described in JP-A No. 2009-107365 causes a complicated structure of the door sash.

SUMMARY

In a side door structure for a vehicle having a side door provided with a door checker which is spaced just below a door sash, the present disclosure provides a technology capable of ensuring a space for mounting the door checker and preventing the door checker from coming into contact with rainwater using a simple configuration.

A first aspect of the present disclosure provides a side door structure for a vehicle, the side door structure including: a door sash; a door panel; and a door checker which is spaced just below the door sash. A lower end of the door sash is connected to the door panel of the side door, the door panel has a recess which is depressed into the side door and vertically elongated, the recess is provided with the door checker, and an upper end of the recess is formed such that an outer end of the upper end in a vehicle width direction is a top portion, and the top portion is located inwardly of the lower end of the door sash. Thus, the rigidity of the door panel may be improved, and the door checker may be mounted on the recess. In addition, just providing the door panel with the recess does not affect the arrangement of other components, and thus it is possible to ensure the space for connecting the door checker to the vehicle body. The inside of the door panel corresponding to the recess has a projecting shape, and the water, which falls from the door sash, may be guided to the outer side of the projecting shape, and thus the door checker may be prevented from coming into contact with water. Consequently, a water guide does not need to be provided separately inside the door panel, and thus the side door has a simple configuration and moldability thereof may be also improved.

According to a second aspect of the present disclosure, it is preferable that an end of the door panel has a sealing surface for mounting a sealing member which seals between the door panel and a vehicle body, the sealing surface borders an outer end of the recess in a vehicle width direction, an area of the border is provided with a vertical wall, and the vertical wall extends below the recess along the sealing surface, and also serves as the vertical wall of the recess. Thus, the area of the sealing surface may be reduced to a minimum necessary amount and the accuracy of the sealing surface may be improved. In addition, the vertical wall is extended below the recess, and thus the accuracy of the sealing surface may be ensured even below the recess. Additionally, the outer side space within the door panel serves as a water path due to the vertical wall, and thus water may be guided stably. Furthermore, a possibility may be reduced that water comes into contact with the components disposed inwardly of the vertical wall.

According to a third aspect of the present disclosure, it is more preferable that the vertical wall has a vertically continuous form without depressions and projections over an entire vertical area. Thus, running water from the door sash may be smoothly guided downward along the vertical wall.

According to a fourth aspect of the present disclosure, it is more preferable that a corner between the vertical wall and the sealing surface is formed to have a sharp outline with no roundness or less roundness. Thus, the vertical wall is formed so as to perpendicularly rise from the rear surface of the sealing surface and it is possible to prevent water from running over the vertical wall. Consequently, water may be prevented from coming into contact with the door checker which is disposed away from the vertical wall. In addition, the corner between the vertical wall and the sealing surface is formed to have a sharp outline, and thus the sealing surface and the vertical wall may be further separated and the accuracy of the sealing surface may be improved.

According to a fifth aspect of the present disclosure, it is more preferable that an upper end edge of the recess is inclined downward from the top portion with respect to an inward vehicle width direction, an inward end of the recess is located inwardly of an inward end of the door checker, and the inward end of the recess intersects with the upper end edge of the recess. Thus, even if water falls inwardly from the top portion due to vibration, water flows along the inclined upper end edge of the recess and is prevented from flowing toward the door checker.

According to a sixth aspect of the present disclosure, it is more preferable that a lower end of the inclined upper end edge of the recess is located at an inward edge of a front face of the door panel. Thus, the door panel may be formed in a smooth shape, the amount of material for molding the door panel may be reduced, and reduction in weight and cost may be achieved. In addition, with the smoothly molded door panel, moldability thereof may be improved.

According to a seventh aspect of the present disclosure, it is more preferable that a bottom surface of the recess has a planar central portion which is at a deepest position in a central height area, an upper inclined portion which is inclined forward from the central portion to the upper end edge of the recess, a lower inclined portion which is inclined forward from the central portion to a lower end edge of the recess, a boundary between the upper end of the central portion and the upper inclined portion, and a boundary between the lower end of the central portion and the lower inclined portion each have a ridgeline, and the door checker is mounted on the central portion. Thus, the central portion is spaced away from the surface over which water flows, and the door checker disposed in the central portion may be prevented from coming into contact with water. In addition, the boundary between the central portion and the upper inclined portion, and the boundary between the central portion and the lower inclined portion are each formed to have a ridgeline, and thus the rigidity of the recess may be improved. Furthermore, the central portion is made to be planar, and thus the accuracy in mounting the door checker may be improved.

According to an eighth aspect of the present disclosure, it is more preferable that a dimension of the central portion in a vehicle width direction is greater than a dimension of the upper inclined portion. Thus the distance between the door checker and a path of water which falls down from the door sash may be spaced away and the door checker may be further prevented from coming into contact with water. In addition, the width of the central portion is increased, and thus the size and layout flexibility of the door checker may be increased.

BRIEF DESCRIPTION OF THE DRAWINGS

The advantages of the disclosure will become apparent in the following description taken in conjunction with the following drawings.

DETAILED DESCRIPTION

An embodiment of the present disclosure will be described with reference to the accompanying drawings.

Embodiment

Figure 1:
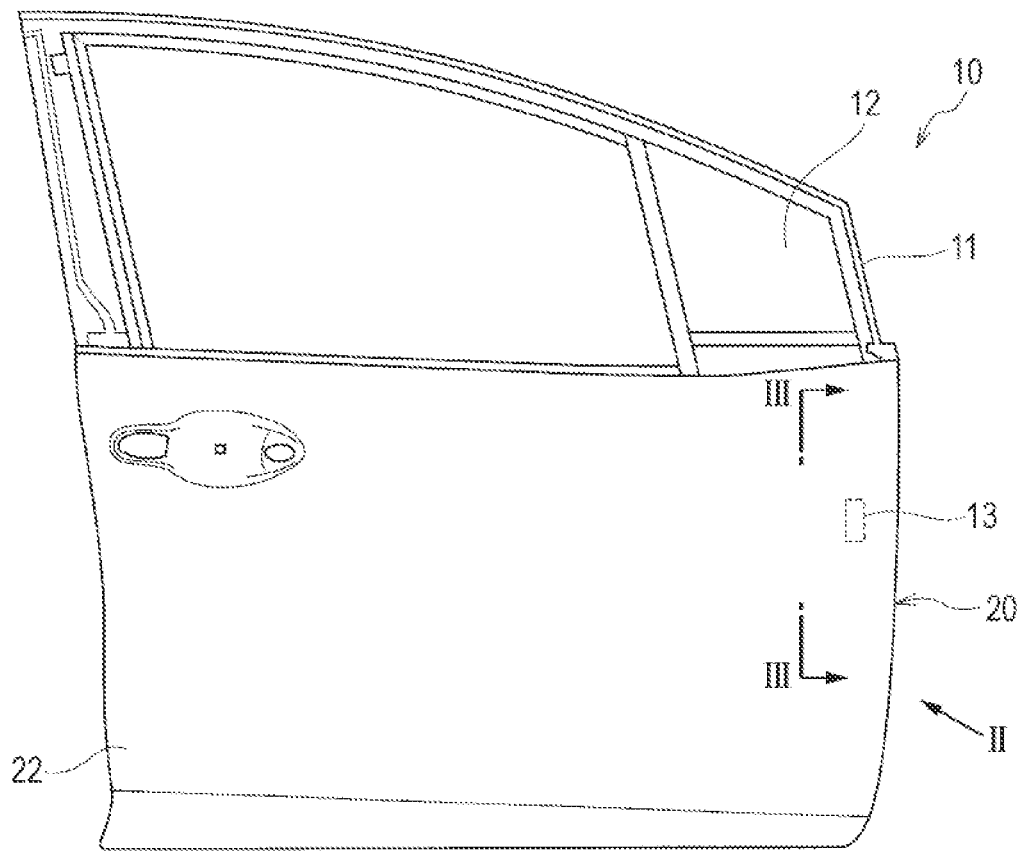
FIG. 1 is a side view of a side door according to an embodiment of the present disclosure.

As illustrated in FIG. 1, a vehicle side door 10 is a hinge door which is provided, for example, on the side of the driver's seat of a vehicle. The side door 10 includes a door panel 20, a door sash 11 provided above the door panel 20, and a door glass 12 supported by the door sash 11.

A vehicle such as an automobile has a door checker 13 that stops an opening operation when the side door 10 is half opened or fully opened. The door panel 20 is provided with the door checker 13 at a position spaced just below the door sash 11. One end of the door checker 13 is connected to the vehicle body.

Figure 2:
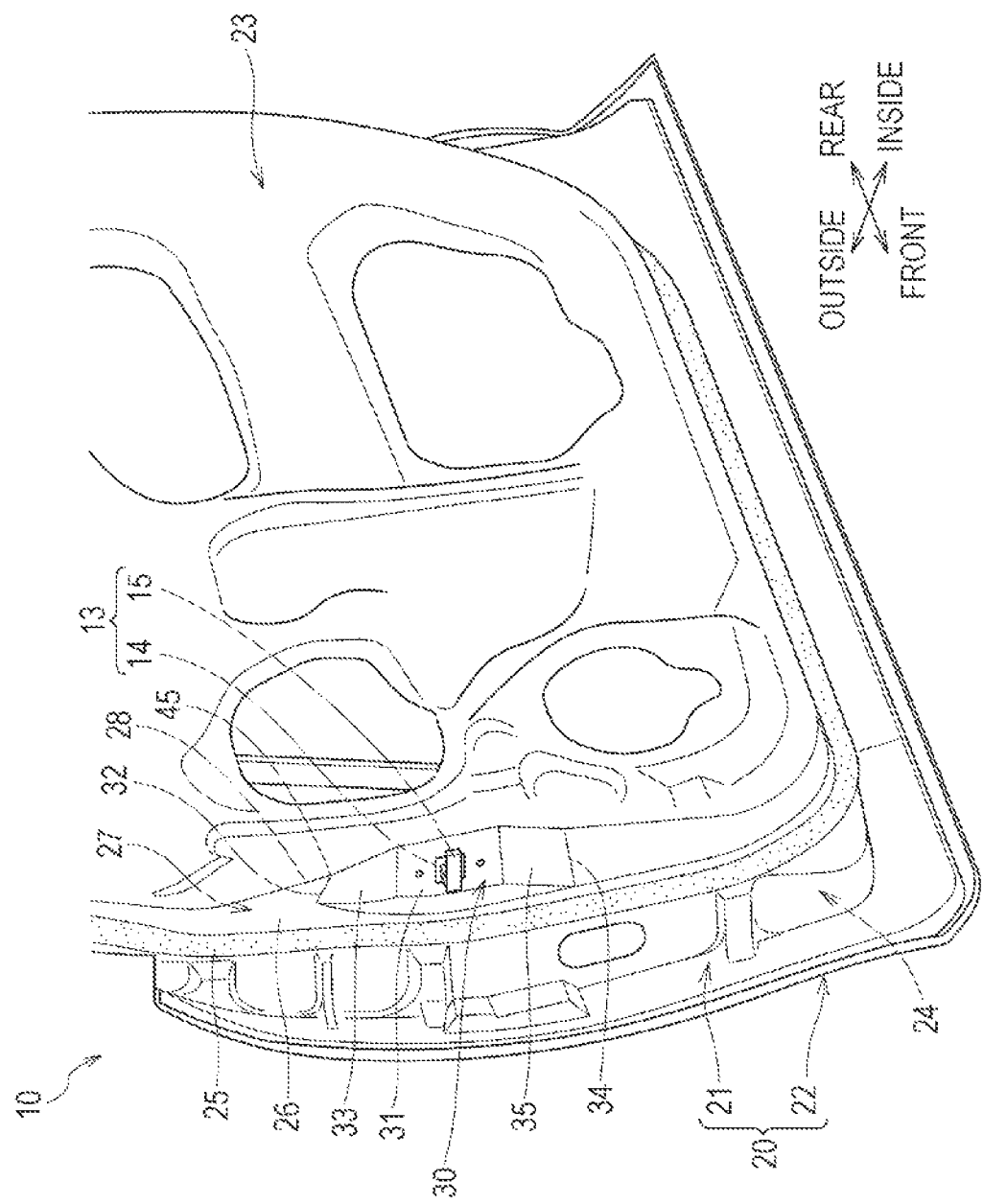
FIG. 2 is a view as seen in the direction of arrow II of FIG. 1.

Next, the side door 10 will be described with reference to the perspective view thereof as seen from the inside of the vehicle. As illustrated in FIG. 2, the door panel 20 includes a metal door inner panel 21 and a metal door outer panel 22 provided outwardly of the vehicle with respect to the door inner panel 21.

The door inner panel 21 has a door panel side portion 23 facing the inside of the vehicle, and an edge portion 24 on which the door checker 13 is mounted. In the edge portion 24, there are formed a recess 30 which is depressed inward the side door 10, and a sealing surface 26 for mounting a sealing member 25. The sealing member 25 is a member which seals between the vehicle body and the side door 10.

The front side of the edge portion 24 forms a door panel front face 27. The door panel front face 27 is bent with respect to the door panel side portion 23 in a so-called mountain fold manner, and an inward edge 28 of the door panel front face 27 is formed to have a sharp outline.

The door checker 13 includes a case 14 mounted on the recess 30, and a check plate 15 which is extendably and retractably provided in the case 14. The end of the check plate 15 is rotatably connected to the vehicle body. When the side door 10 is opened, the check plate 15 is extended from the case 14, and when side door 10 is closed, the check plate 15 is retracted in the case 14.

The bottom surface of the recess 30 includes a central portion 31 which is formed at the deepest position in the central height area, an upper inclined portion 33 which is inclined forward from the central portion 31 to an upper end edge 32 of the recess 30, and a lower inclined portion 35 which is inclined forward from the central portion 31 to a lower end edge 34 of the recess 30. The central portion 31 is formed to be planar. For this reason, the door checker 13 may be easily mounted on the central portion 31.

Figure 3:
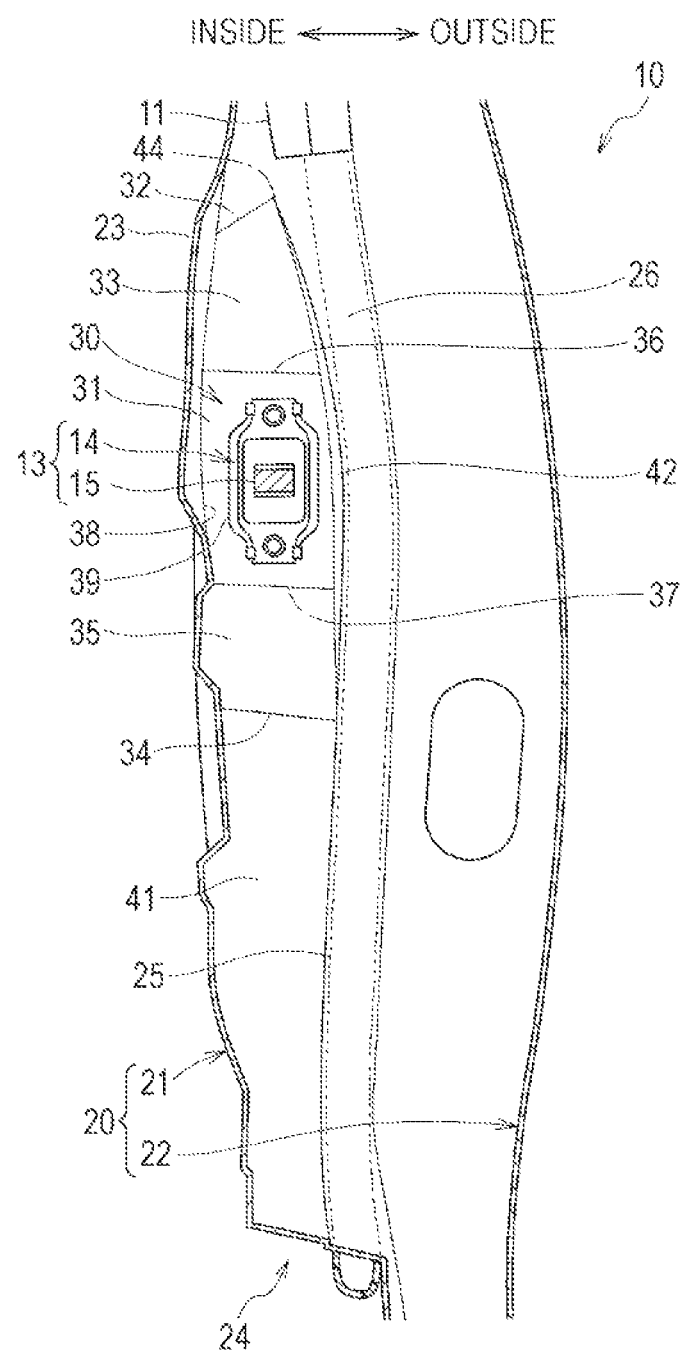
FIG. 3 is a cross-sectional view of the side door taken along line III-III of FIG. 1.

Next, the inside of the door panel 20 will be described with reference to a cross-sectional view thereof. As illustrated in FIG. 3, in the door panel 20, the recess 30 projects to the front side of FIG. 3. The recess 30 is located below the door sash 11, and is formed in an elongated shape in a vertical direction.

The upper inclined portion 33 is formed to have a width gradually increasing from the upper end edge 32 toward a lower position. The central portion 31 has a width gradually increasing from a boundary 36 between the upper end of the central portion 31 and the upper inclined portion 33 toward a lower position, and has an approximately constant width from an approximately the center of the height to a lower position, the width being in a direction of the width of the vehicle. The lower inclined portion 35 is formed to have an approximately constant width from a boundary 37 between the lower end of the central portion 31 and the lower inclined portion 35 toward a lower position.

A lower surface 41 is formed from the lower end edge 34 of the lower inclined portion 35 to the lower end of the edge portion 24. The recess 30 and the lower surface 41 are located on inner side of the vehicle with respect to the sealing surface 26, and projects from the sealing surface 26 to the front side of FIG. 3. The lower surface 41 has a less amount of projection than the amount of projection of the recess 30. Not only the front side of the door panel 20 serves as the sealing surface 26, but also the back side of the door panel 20 serves as the sealing surface 26 for the sake of convenience.

An inward end 38 of the recess 30 is located inwardly of the inward end 39 of the case 14. The width of the central portion 31 in a vehicle width direction is greater than the width of the upper inclined portion 33 in a vehicle width direction. The central portion 31 is formed to be planar. Thus, the central portion 31 has a relatively large area, and the door checker 13 may have an improved arrangement layout and may be easily mounted on the central portion 31.

Figure 4:
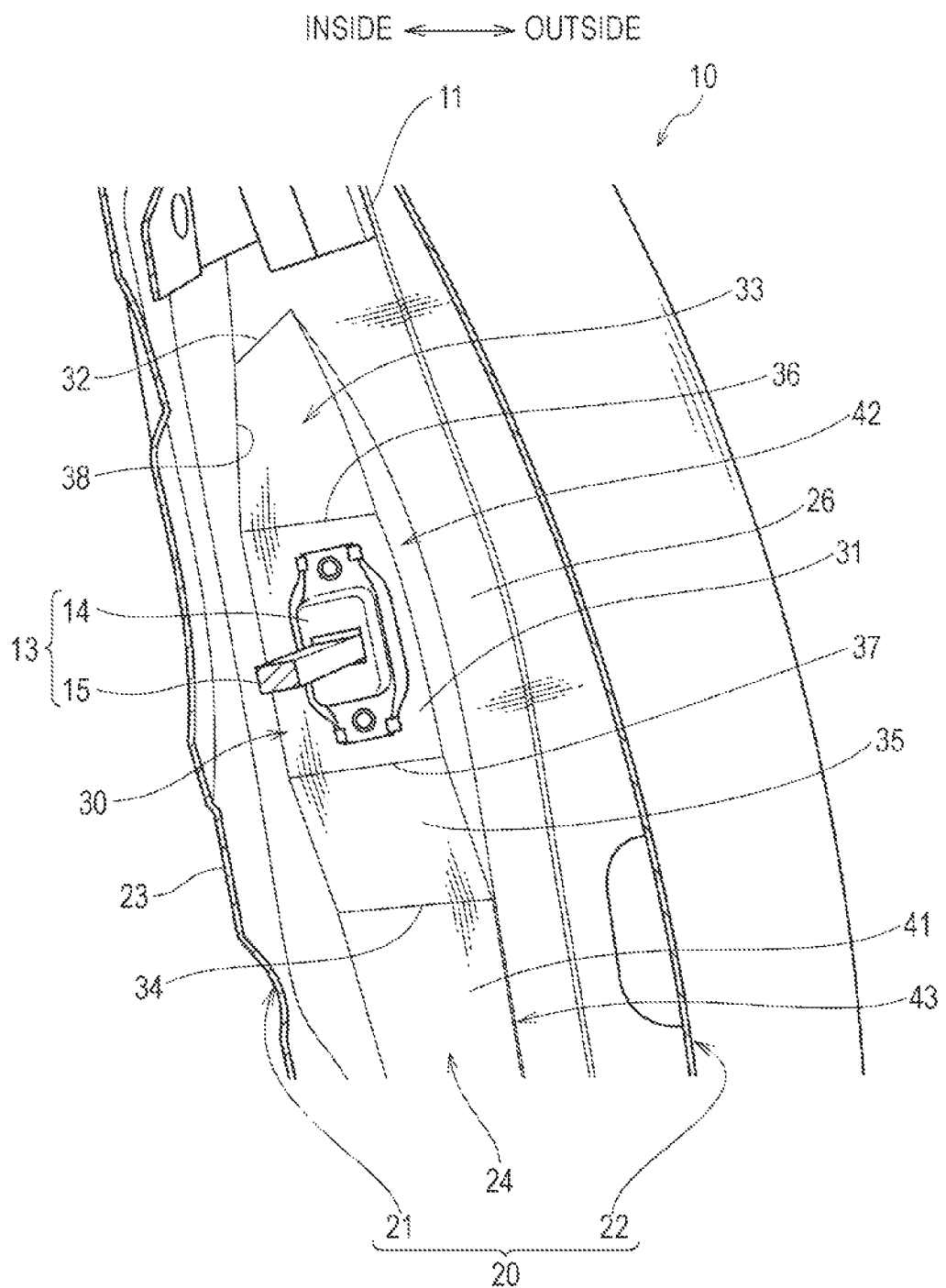
FIG. 4 is a perspective view of the main portion of the side door illustrated in FIG. 3.

Next, the inside of the door panel 20 will be described with reference to the perspective view thereof. As illustrated in FIG. 4, the sealing surface 26 borders the outer end of the recess 30 in a vehicle width direction, and a vertical wall 42 is formed in the bordering area. The vertical wall 42 is provided so as to smoothly connect the outer ends in a vehicle width direction of the upper inclined portion 33, the central portion 31, and the lower inclined portion 35, and has a vertical wall strip portion 43 which extends below the recess 30 along the sealing surface 26.

The lower surface 41 is inwardly protruded to be higher than the sealing surface 26 by one step due to the vertical wall strip portion 43. The vertical wall 42 has a vertically continuous form without depressions and projections over the entire vertical area including the vertical wall strip portion 43.

In addition, the boundary 36 between the upper end of the central portion 31 and the upper inclined portion 33, and the boundary 37 between the lower end of the central portion 31 and the lower inclined portion 35 are each formed to have a ridgeline. The bottom surface of the recess 30 is formed to have a ridgeline and also the recess 30 has the vertical wall 42, and thus the rigidity of the recess 30 may be improved and the mounting rigidity of the door checker 13 may also be improved.

Figure 5:
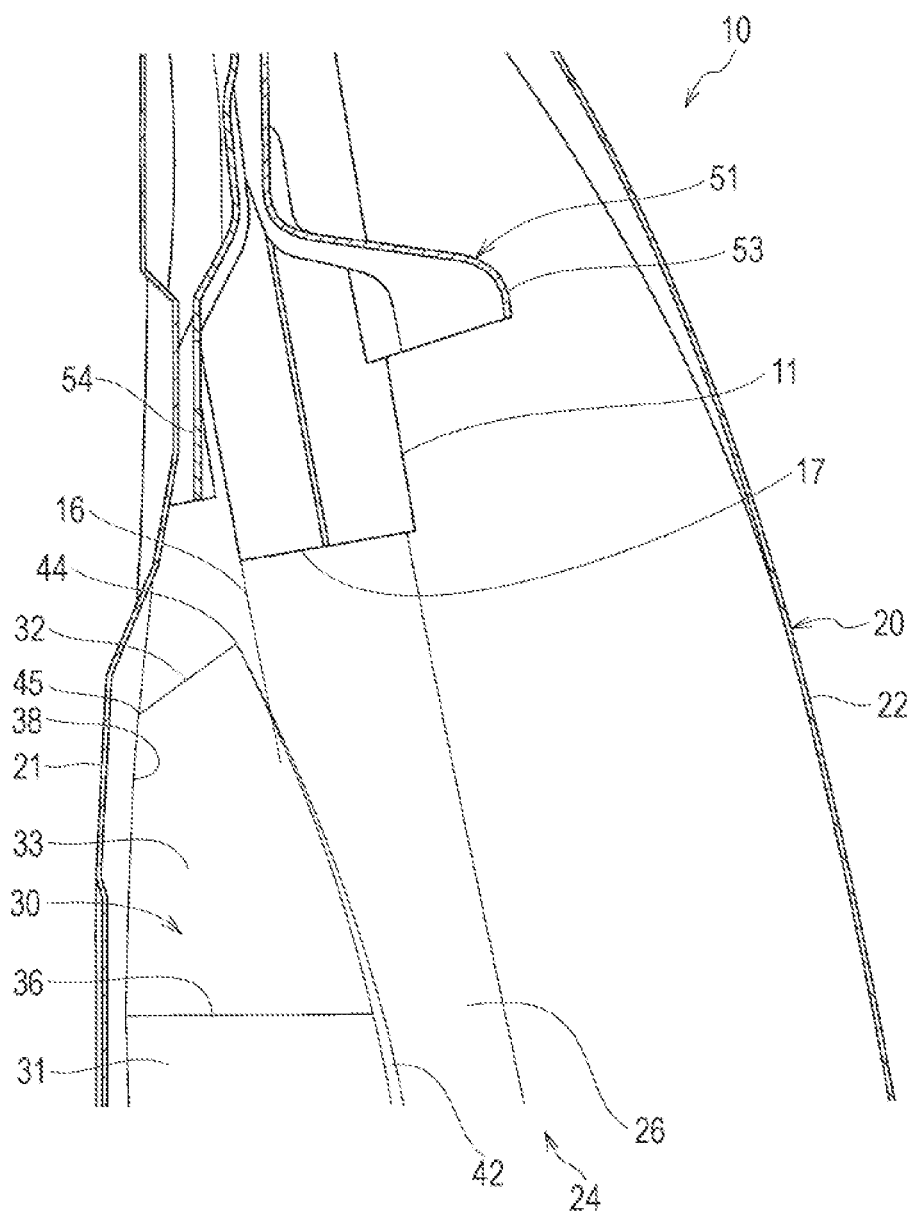
FIG. 5 is an enlarged view of the main portion of the side door illustrated in FIG. 3.
Figure 6:
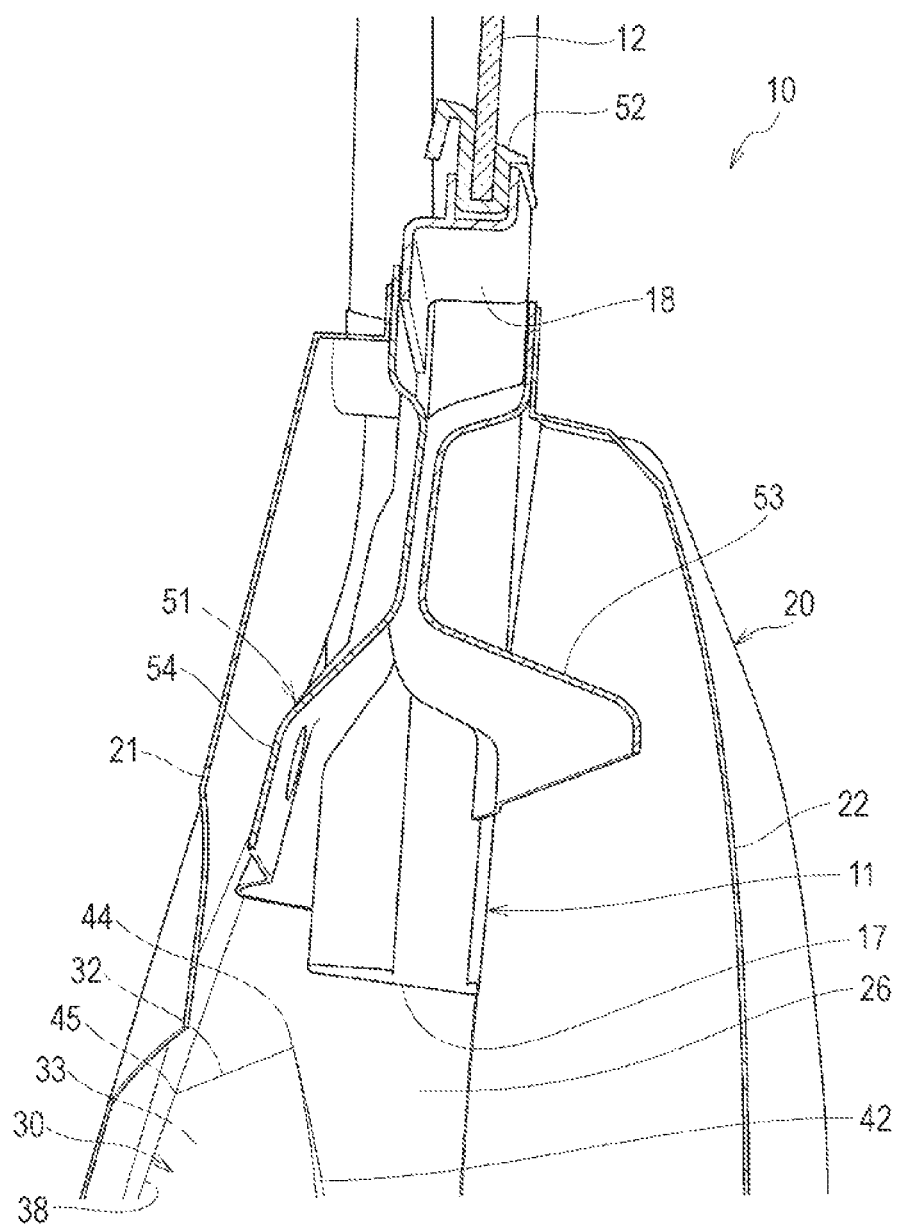
FIG. 6 is a perspective view of an upper portion of the side door illustrated in FIG. 4.

Next, the main portion of the side door will be described. As illustrated in FIGS. 3, 5, and 6, the lower end of the door sash 11 is connected to the inner side of the door panel 20. The upper end edge 32 of the upper inclined portion 33 is formed such that the outer end of the upper end edge 32 in a vehicle width direction is a top portion 44. The top portion 44 is located inwardly of an extension line 16 of the laterally inward end of the door sash 11. The top portion 44 is located inwardly of a lower end 17 of the door sash 11.

Therefore, rainwater, which falls from the door sash 11 along the sealing surface 26, falls outwardly of the top portion 44 in a vehicle width direction. The rainwater then flows down along the vertical wall 42. As a result, the rainwater does not run over the central portion 31 from the upper inclined portion 33.

The upper end edge 32 of the upper inclined portion 33 is inclined downward from the top portion 44 with respect to the inward vehicle width direction, and intersects with the inward end 30 of the recess 30. When seen from the outside of the door panel 20, the lower end 45 of the inclined edge 32 is located at the inward edge 28 of the door panel front face 27 illustrated in FIG. 2. Thus, the door inner panel 21 may be formed in a smooth shape, and the amount of material for molding the door inner panel 21 may be reduced as much as possible.

The lower end of the door sash 11 is connected to the inner side of the door panel 20, and part of the lower end is covered by a stiffener 51. The stiffener 51 is provided in an upper portion of the door panel 20. A lower piece 18 of the door sash 11 is supported above the door panel 20 via the stiffener 51. The door glass 12 is supported by the lower piece 18 via a weather strip 52.

The lower part of the stiffener 51 is expanded with an umbrella-shaped cross-section, and has an outer plate portion 53 on the outer side and an inner plate portion 54 on the inner side. The lower end of the outer plate portion 53 is located in the vicinity of the door outer panel 22. The lower end of the inner plate portion 54 is located in the vicinity of the door inner panel 21. The lower end of the inner plate portion 54 is located inwardly of the top portion 44 of the recess 30 in a vehicle width direction.

If rainwater falls through the inner plate portion 54 of the stiffener 51, the water runs on the sealing surface 26 and reaches the upper end edge 32 of the recess 30. The upper end edge 32 of the recess 30 is inclined downward with respect to the inward vehicle width direction, and thus the water is guided to the inward end 38 of the recess 30 along the upper end edge 32, and flows down along the inward end 33 of the recess 30. Therefore, the water may be prevented from coming into contact with the door checker 13.

Figure 7:
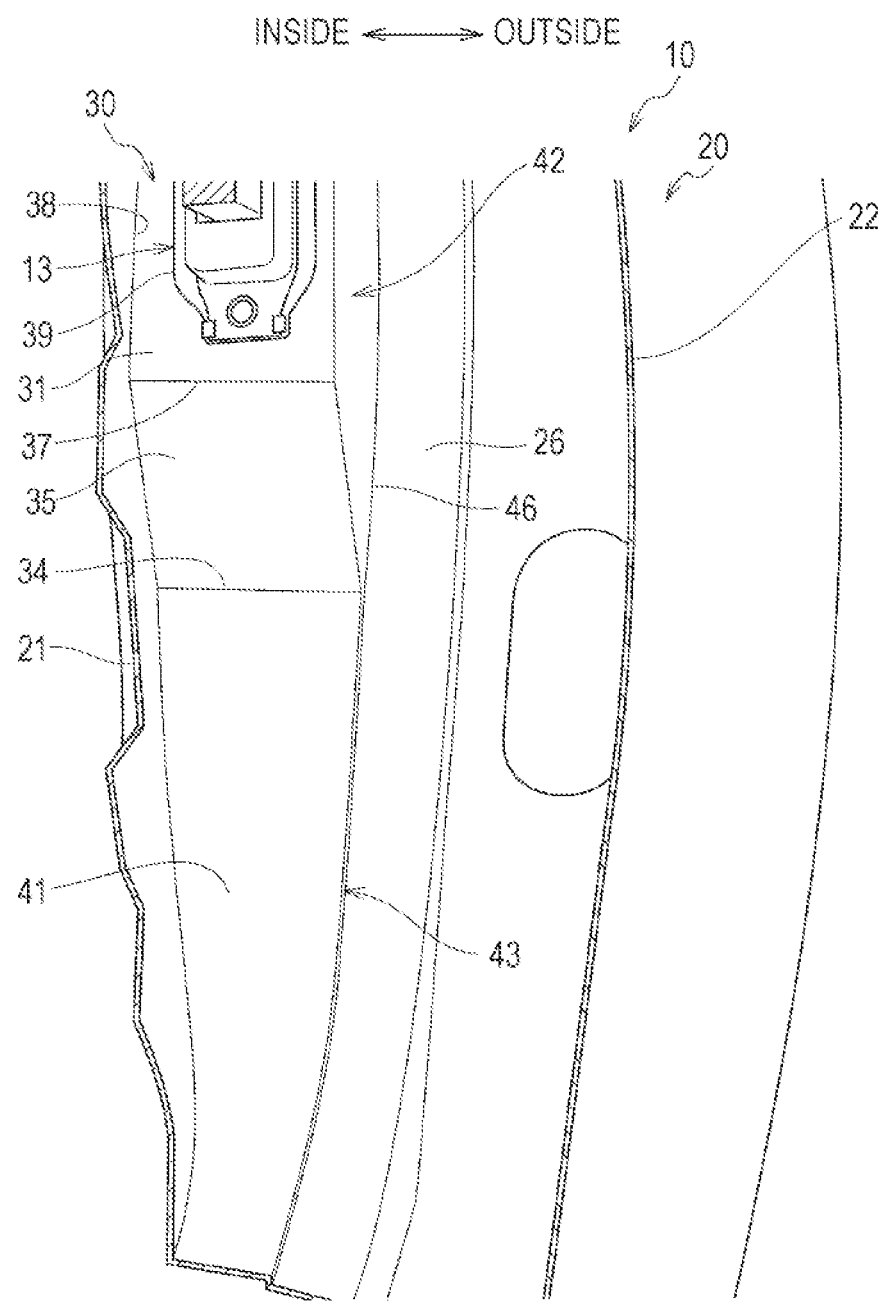
FIG. 7 is a perspective view of a lower portion of the side door illustrated in FIG. 4.

As illustrated in FIG. 7, a corner 46 between the vertical wall 42 and the sealing surface 26 is formed to have a sharp outline with no roundness or less roundness. Thus, water which flows from above along the corner 46 may be prevented from running over the vertical wall 42 and reaching the recess 30. Similarly, water may be prevented from running over the vertical wall strip portion 43 and reaching the lower surface 41.

The vertical wall 42 is formed in a smooth shape over the entire area from the recess 30 to the vertical wall strip portion 43, and is continuously formed to the bottom part of the door inner panel 21. Therefore, water may flow over the sealing surface 26 from the door sash 11 to the bottom part of the door panel 20. A simple structure like this allows the processing cost of the door panel 20 to be reduced.

Figure 8:
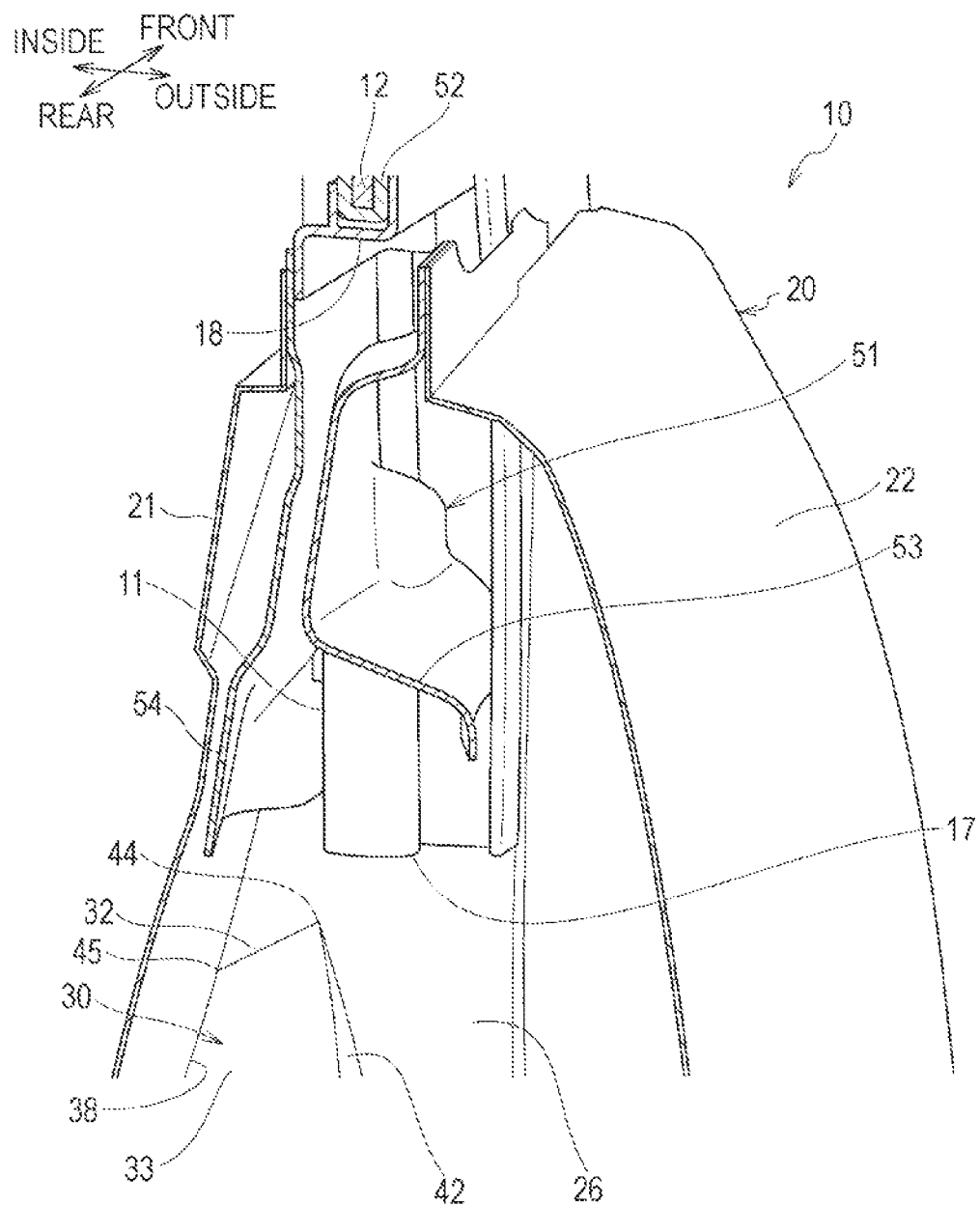
FIG. 8 is a perspective view of the periphery of a stiffener illustrated in FIG. 6.

As illustrated in FIG. 8, the front end of the stiffener 51 is connected to the door sash 11. The upper portion of the stiffener 51 has an upward open shape. For this reason, rainwater may flow over the door sash 11 and the lower piece 18 of the door sash 11 to reach the stiffener 51, and water may fall from the lower ends of the outer plate portion 53 and the inner plate portion 54 of the stiffener 51.

The rainwater, however, does not fall on the recess 30 because the lower end of the outer plate portion 53 of the stiffener 51 is located outwardly of the lateral outer end of the recess 30 in a vehicle width direction. The lower end of the inner plate portion 54 of the stiffener 51 is located in the vicinity of the door inner panel 21, and thus water, which falls from the lower end of the inner plate portion 54, is guided from the upper end edge 32 of the recess 30 to the inward end 38 of the recess 30.

Figure 9:
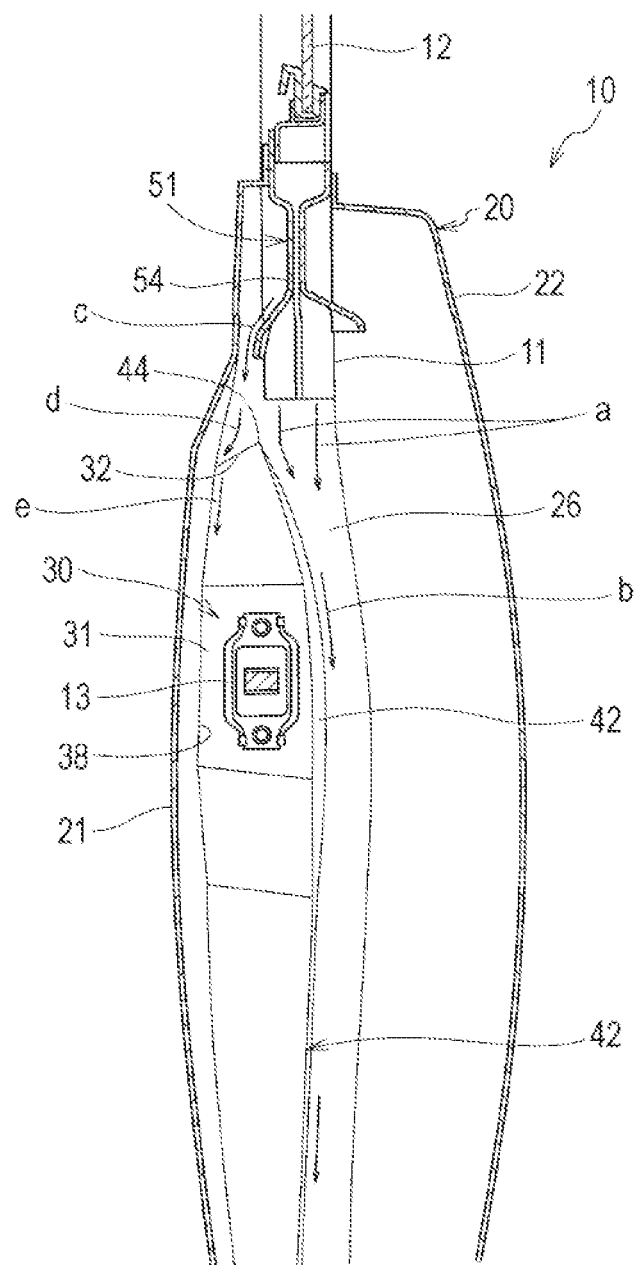
FIG. 9 is an effect view of the side door according to the embodiment of the present disclosure.

The effect of the above-described side door 10 will be described below. As illustrated in FIG. 9, the water, which falls from the door sash 11 as indicated by arrows "a," flows from the top portion 44 along the wall 42 on the right in FIG. 9, and flows down as indicated by arrow "b."

The water, which falls from the inner plate portion 54 of the stiffener 51 as indicated by arrow "c," flows as indicated by arrow "d" due to the upper end edge 32 of the recess 30, and further flows down along the inward end 38 of the recess 30 as indicated by arrow "e."

The wall 42 and the inward end 38 are formed at a position spaced from the door checker 13, and thus the water may be prevented from coming into contact with the door checker 13.

The side door described above will be summarized below. As illustrated in FIGS. 2 and 5, the door panel 20 is provided with the recess 30 which is depressed in the side door 10 and vertically elongated. Because the door panel 20 is provided with the recess 30, the rigidity of the door panel 20 may be improved and the door checker 13 may be mounted on the recess 30. In addition, just providing the door panel 20 with the recess 30 does not affect the arrangement of other components, and so it is possible to ensure the space for connecting the door checker 13 to the vehicle body.

In addition, the top portion 44 at the outer end in a vehicle width direction of the upper end of the recess 30 is located inwardly of the lower end 17 of the door sash 11. The inside of the door panel 20 corresponding to the recess 30 has a projecting shape, and the water, which falls from the door sash 11, may be guided to the outer side of the projecting shape, and thus the door checker 13 may be prevented from coming into contact with the water. Consequently, a water guide does not need to be provided separately inside the door panel 20, and so the side door 10 has a simple configuration and moldability thereof may be also improved.

As illustrated in FIG. 3, the sealing surface 26 borders the outer end of the recess 30 in a vehicle width direction, and an area of the border is provided with the vertical wall 42. Thus the recess 30 and the sealing surface 26 may be separated. Thus, the area of the sealing surface 26 may be reduced to a minimum necessary amount and the accuracy of the sealing surface 26 may be improved. In addition, the vertical wall 42 is extended below the recess 30, and thus the accuracy of the sealing surface 26 may be ensured even below the recess 30. Additionally, the outer side space within the door panel 20 serves as a water path due to the vertical wall 42, and thus water may be guided stably. Furthermore, a possibility may be reduced that water comes into contact with the components disposed inwardly of the vertical wall 42.

As illustrated in FIGS. 3 and 7, the vertical wall 42 has a vertically continuous form without depressions and projections over the entire vertical area, and thus running water from the door sash 11 may be smoothly guided downward along the vertical wall 42.

As illustrated in FIG. 7, the corner 46 between the vertical wall 42 and the sealing surface 26 is formed to have a sharp outline with no roundness or less roundness, and thus the vertical wall 42 is formed so as to perpendicularly rise from the sealing surface 26 and it is possible to prevent water from running over the vertical wall 42. Consequently, water may be prevented from coming into contact with the door checker 13 which is disposed away from the vertical wall 42. In addition, the corner 46 between the vertical wall 42 and the sealing surface 26 is formed to have a sharp outline, and this the sealing surface 26 and the vertical wall 42 may be further separated and the accuracy of the sealing surface 26 may be improved.

As illustrated in FIGS. 3 and 5, the upper end edge 32 of the recess 30 is inclined downward from the top portion 44 with respect to the inward vehicle width direction, and thus even if water falls inwardly from the top portion 44 due to vibration, water flows along the inclined upper end edge 32 of the recess 30 and is prevented from flowing toward the door checker 13.

As illustrated in FIGS. 2 and 3, the lower end of the inclined upper end edge 32 of the recess 30 is located at the inward edge 28 of the door panel front face 27, and thus the door panel 20 may be formed in a smooth shape, the amount of material for molding the door panel 20 may be reduced, and reduction in weight and cost may be achieved. In addition, with the smoothly molded door panel 20, moldability thereof may be improved.

As illustrated in FIGS. 3 and 4, the central portion 31 is located at the deepest position of the recess 30, and is spaced away from the surface 26 over which water flows, and the door checker 13 disposed in the central portion 31 may be prevented from coming into contact with water. In addition, the boundary 36 between the central portion 31 and the upper inclined portion 33, and the boundary 37 between the central portion 31 and the lower inclined portion 35 are each formed to have a ridgeline, and thus the rigidity of the recess 30 may be improved. Furthermore, the central portion 31 is made to be planar, and thus the accuracy in mounting the door checker 13 may be improved.

As illustrated in FIG. 3, the dimension of the central portion 31 in a vehicle width direction is greater than the dimension of the upper inclined portion 33 in a vehicle width direction, and thus the distance between the door checker 13 and a path of water which falls down from the door sash 11 may be spaced away, and the door checker 13 may be further prevented from coming into contact with water. In addition, the width of the central portion is increased, and thus the size and layout flexibility of the door checker 13 may be increased.

In the embodiment, the side door 10 is on the side of the driver's seat of the vehicle. However, without being limited to this, the side door 10 may be a side door in another position such as on the passenger side of the vehicle as long as the side door is provided with a door checker which is spaced just below the door sash. In addition, in the embodiment, the upper end edge 32 of the recess 30 is formed to be linear. However, without being limited to this, the upper end edge 32 may be formed to be curved as long as the upper end edge 32 is inclined downward from the top portion 44 with respect to the inward vehicle width direction. Furthermore, in the embodiment, the upper inclined portion 33 and the lower inclined portion 35 are formed to be planar. However, without being limited to this, the upper inclined portion 33 and the lower inclined portion 35 may be formed to be curved as long as the upper end boundary 36 of the central portion 31 and the lower end boundary 37 of the central portion 31 are each formed to have a ridgeline.

The side door structure for a vehicle of the present disclosure is preferably applicable to a vehicle having a side door provided with a door checker which is spaced just below a door sash.

Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A side door structure of a side door for a vehicle, comprising:
   a door sash;
   a door panel, wherein a lower end of the door sash is connected to the door panel; and
   a door checker disposed just below and spaced apart from the door sash,
   wherein the door panel has a recess vertically elongated and recessed into an inside of the side door,
   the door checker is disposed in the recess,
   an upper edge of the recess has a peak portion at an outer end in a vehicle width direction, and
   the peak portion is located at an inner position than the lower end of the door sash in the: vehicle width direction.

2. The side door structure according to claim 1,
wherein an end surface of the door panel has a sealing surface for mounting a sealing member which seals between the door panel and a vehicle body,
the sealing surface is disposed adjacent to an outer end of the recess in the vehicle width direction,
a vertical wall is provided at a border between the sealing surface and the recess, and
the vertical wall extends downward beyond the recess along the sealing surface, and a part of the vertical wall is a side wall of the recess.

3. The side door structure according to claim 2,
wherein the vertical wall has a vertically continuous shape without depressions and projections over an entire vertical area.

4. The side door structure according to claim 2,
wherein a corner between the vertical wall and the sealing surface has a sharp outline with no roundness or less roundness.

5. The door structure according to claim 1,
wherein the upper edge of the recess is inclined downward from the peak portion to an inward in the vehicle width direction,
an inward edge of the recess in the vehicle width direction is located at an inner position than an inward end of the door checker in the vehicle width direction, and
the inward edge of the recess intersects with the upper edge of the recess.

6. The side door structure according to claim 5,
wherein a lower end of the inclined upper edge of the recess is located at an inward edge in the vehicle width direction of a front face of the door panel.

7. The side door structure according to claim 1,
wherein a bottom surface of the recess includes:
a planar central portion at a deepest recessed position in a central height area,
an upper inclined portion which extends from the central portion to the upper edge of the recess to become shallower from the central portion to the upper edge of the recess,
a lower inclined portion which extends from the central portion to a lower edge of the recess to become shallower from the central portion to the lower edge of the recess,
a boundary between an upper end of the central portion and the upper inclined portion, and a boundary between a lower end of the central portion and the lower inclined portion each have a ridgeline, and
the door checker is mounted in the central portion.

8. The side door structure according to claim 7,
wherein a dimension of the central portion in the vehicle width direction is greater than a dimension of the upper inclined portion in the vehicle width direction.

9. The side door structure according to claim 1, wherein the peak portion has an angled shape.

10. The side door structure according to claim 2, wherein the recess is disposed on the end surface of the door panel and the vertical wall protrudes from the sealing surface toward inside of the door panel.

* * * * *